A. DIETZ.
Cart for Heating and Conveying Plastic Composition.
No. 198,359. Patented Dec. 18, 1877.
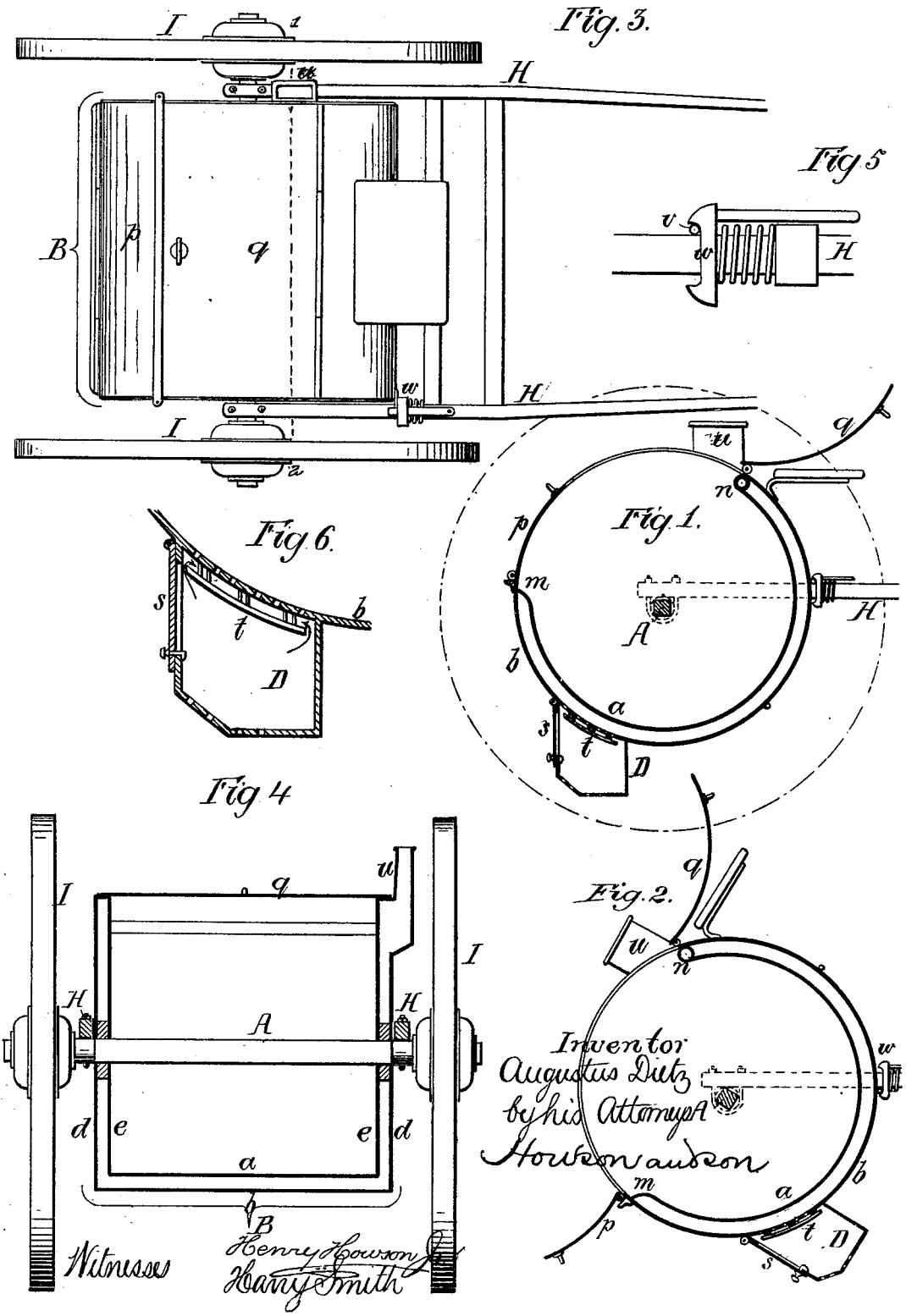

UNITED STATES PATENT OFFICE.

AUGUSTUS DIETZ, OF PHILADELPHIA, PENNSYLVANIA.

IMPROVEMENT IN CARTS FOR HEATING AND CONVEYING PLASTIC COMPOSITION.

Specification forming part of Letters Patent No. 198,359, dated December 18, 1877; application filed October 10, 1877.

*To all whom it may concern:*

Be it known that I, AUGUSTUS DIETZ, of Philadelphia, Pennsylvania, have invented a new and useful Improvement in Carts for Heating and Conveying Plastic Composition, of which the following is a specification:

The object of my invention is to construct a portable apparatus for conveying and heating asphalt-pavement composition, and for depositing it on the ground.

In the accompanying drawing, Figures 1 and 2 are vertical sections of the heating-vessel in two positions; Fig. 3, a plan view; Fig. 4, a transverse vertical section on the line 1 2; and Figs. 5 and 6, detached views.

To an axle, A, provided with loose wheels I, is secured a vessel, B, consisting of inner and outer cylindrical casings $a$ and $b$, and inner and outer plates $d$ and $e$ at opposite ends of the vessel, the space intervening between these plates communicating with that between the two cylindrical casings. The continuity of the latter casings is interrupted by an opening extending from $m$ to $n$, Figs. 1 and 2, and from end to end of the vessel; and to the edge $m$ is hinged a segmental door, $p$, a similar door, $q$, being hinged to the edge $n$ of the opening, and the doors being provided with suitable fastenings.

To the lower portion of the outer casing $b$ of the vessel is secured a fire-box, D, having a doorway through which fuel can be introduced, and which is provided with a hinged door, $s$. There is a suitable grating at the bottom of the fire-box, and such air-openings at the ends or sides of the same as may be necessary for the proper combustion of the fuel in the box.

The products of combustion, instead of communicating directly with the space between the two casings of the vessel, first impinge against a deflecting-plate, $t$, and then pass in the direction of the arrows between the edges of the plate and sides of the fire-box to the space between the deflecting-plate and the outer casing of the vessel, then through perforations in the same, after which they traverse the intervening space between the two casings of the vessel, and finally pass off through the chimney $u$.

Shafts H H are hung loosely to the axle, on which the wheels I I are arranged to revolve. The vessel B can be locked in the two positions, Figs. 1 and 2—in the present instance by a spring-catch, $w$, arranged to slide on the shaft H, and adapted to pins $v\ v$ on the vessel. (See Fig. 5.)

When the vessel is in the position, Fig. 1, and the door $q$ is open, as shown, the interior may be filled, or nearly filled, with the composition, after which the said door $q$ may be closed, and the vessel may be hauled to any desired point while the contents are heated and maintained at the desired consistency.

In order to dump the plastic contents of the vessel onto the ground, the doors $p$ and $q$ are opened, the casing B unlocked from the shafts by manipulating the spring-catch $w$, and then turned to the position, Fig. 2, where it is held by the catch until all the contents are removed, the large space uncovered by the doors $p$ and $q$ allowing this operation to be performed with facility.

The vessel may be drawn forward during the discharge of the contents, so as to deposit a layer of the composition onto the ground.

The object of the deflecting-plate $t$ is to prevent the overheating of the contents of the vessel at and near the fire-place.

Although I prefer a cylindrical vessel, it may be square or many-sided.

I claim as my invention—

1. The combination of the axle A and the loose wheels on the same with the vessel B, secured to the axle, and consisting of two casings, with intervening space, and with a fire-box, D, communicating with the said space, all substantially as set forth.

2. The combination of the outer perforated casing $b$ of the vessel B with the fire-box D and deflecting-plate $t$.

3. The combination of the vessel B, which admits of being turned to and locked in the two positions described, with the doors $p$ and $q$, the former hinged at its upper edge, and the latter at its lower edge, to the said vessel, as set forth, for the purpose specified.

In testimony whereof I have signed my name to this specification in the presence of two subscribing witnesses.

AUGUSTUS DIETZ.

Witnesses:
HERMANN MOESSNER,
HARRY SMITH.